(12) United States Patent
Semmelhack et al.

(10) Patent No.: US 11,180,279 B1
(45) Date of Patent: Nov. 23, 2021

(54) COLLAPSABLE AND REUSABLE SHIPPING BOX AND METHOD OF USE

(71) Applicant: Boox PBC, Petaluma, CA (US)

(72) Inventors: Matthew Semmelhack, Petaluma, CA (US); Paige Russell, Petaluma, CA (US)

(73) Assignee: Boox PBC, Petaluma, CA (US)

( * ) Notice: Subject to any disclaimer, the term of this patent is extended or adjusted under 35 U.S.C. 154(b) by 0 days.

(21) Appl. No.: 17/125,489

(22) Filed: Dec. 17, 2020

Related U.S. Application Data

(60) Provisional application No. 63/061,595, filed on Aug. 5, 2020.

(51) Int. Cl.
| | |
|---|---|
| *B65D 5/36* | (2006.01) |
| *B65D 5/42* | (2006.01) |
| *B31B 110/35* | (2017.01) |
| *B31B 120/30* | (2017.01) |
| *B31B 50/73* | (2017.01) |
| *B31B 120/10* | (2017.01) |

(52) U.S. Cl.
CPC ............ *B65D 5/3635* (2013.01); *B31B 50/73* (2017.08); *B65D 5/3692* (2013.01); *B65D 5/4212* (2013.01); *B31B 2110/35* (2017.08); *B31B 2120/102* (2017.08); *B31B 2120/302* (2017.08)

(58) Field of Classification Search
CPC .............. B65D 81/3897; B65D 5/3635; B65D 5/4266; B65D 5/36; B65D 5/42; B31B 2120/302

USPC ......................................................... 229/117
See application file for complete search history.

(56) References Cited

U.S. PATENT DOCUMENTS

| | | | |
|---|---|---|---|
| 4,949,845 A | 8/1990 | Dixon | |
| 10,279,981 B2* | 5/2019 | Barlas | ................ B65D 81/3897 |
| 10,913,574 B1* | 2/2021 | Winn | ................ B65D 25/2808 |
| 2005/0006446 A1 | 1/2005 | Stafford, Jr. | |
| 2008/0250797 A1* | 10/2008 | Rozendaal | ............. F25D 29/00 62/127 |
| 2014/0262862 A1* | 9/2014 | Rothschild | ............... A45C 9/00 206/216 |
| 2017/0320615 A1* | 11/2017 | Izquierdo | ................. B65D 5/40 |
| 2018/0222625 A1* | 8/2018 | Perella | ..................... B65D 9/14 |

FOREIGN PATENT DOCUMENTS

| | | |
|---|---|---|
| CN | 2050412 U | 1/1990 |
| CN | 2688629 Y | 3/2005 |
| CN | 209127167 U | 7/2019 |
| DE | 4028246 A1 | 3/1992 |

OTHER PUBLICATIONS

General Specifications—Glossary—Coroplast—An Inteplast Group Company, 1 page.

* cited by examiner

*Primary Examiner* — Anthony D Stashick
*Assistant Examiner* — Raven Collins
(74) *Attorney, Agent, or Firm* — DLA Piper LLP (US)

(57) ABSTRACT

A collapsible, reusable shipping box has an initial flat configuration, a box configuration and a mailer configuration. In the mailer configuration, the mailer can be returned.

7 Claims, 12 Drawing Sheets

COLLAPSABLE AND REUSABLE SHIPPING BOX AND METHOD OF USE

PRIORITY CLAIMS RELATED APPLICATIONS

This application claims priority under 35 USC 119(e) to U.S. Provisional Patent Application Ser. No. 63/061,595 filed Aug. 5, 2020 entitled "Collapsable and Reusable Shipping Box and Method of Use", the entirety of which is incorporated herein by reference.

APPENDIX

Appendix A (1 page) is a spec sheet for the commercially available Coroplast material that can be used for the box material. Appendix A forms part of the specification.

FIELD

The disclosure relates to a reusable parcel shipping box.

BACKGROUND

The vast majority of parcels shipped from businesses to consumers today are packaged in corrugated cardboard or paperboard boxes. Cardboard is cheap to make and easy to form into rectilinear boxes using a variety of folding methods. However, it has many characteristics that lead to issues with disposal or are bothersome to consumers. As online shopping and home delivery volumes have grown enormously over the last 20 years, a variety of problems related to cardboard now exist, and are getting worse every year. The core issue with cardboard boxes is that they are designed for single use—that is, once they have been shipped from a business to a consumer, the consumer disposes of the box and it has reached its End Of Life. In the race to provide cheaper and cheaper packaging, cardboard boxes lack the durability to protect the product being shipped; create a nuisance to consumers who must dispose them; and cause significant environmental damage. Businesses and consumers alike are demanding alternative solutions.

There are a number of environmental issues with the existing cardboard shipping boxes. For example, although a high percentage of cardboard can be recycled, much of it still ends up in landfills. In fact, cardboard and paperboard are the #1 component, by weight, in landfills today. Though the majority of municipalities in the developed world offer some level of residential cardboard recycling via curbside pickup, several factors including moisture, food scraps, packaging tape, or mixed materials can complicate or negate the recycling process.

The primary raw material necessary for making cardboard is tree pulp, which requires cutting down mature trees, plus high amounts of energy and water to process the whole trees into pulp, then the pulp into paper and then to turn the paper into corrugated cardboard. Trees sequester and store large amounts of carbon dioxide, which is released into the atmosphere when the trees are cut down and processed, leading to global warming. Though cardboard can be recycled to make more of the same material, this process also requires huge amounts of energy to transport, sort, and mill the used material, then high quantities of water to process the pulp back into the usable corrugated material. The resulting strands of wood pulp become shorter each time they are processed, meaning virgin materials are always added to the mixture to create even "recycled" cardboard boxes.

In addition to the problems described above, an ancillary downside of single-use cardboard boxes is the annoying and time-consuming process of breaking down the boxes so they will fit into residential trash- or recycle-bins. As home delivery volumes have risen, consumers are increasingly frustrated with the task of trying to fit a week's worth of product packaging into the existing standard-sized garbage or recycling bin used by their local municipal waste collection company.

Lastly, many cardboard boxes are not suitable for sending back returns or exchanges of products. Many e-commerce retailers market the ease of returns or exchanges for free or for a nominal fee to their consumers. However, typical cardboard boxes are not designed to be re-used, meaning a consumer may have to obtain a new box, packaging tape, and shipping label in order to return or exchange a product.

The problems associated with cardboard boxes have only relatively recently been exacerbated by a combination of factors: 1. Exponential increase in home delivery due to the growth of internet e-commerce; 2. China recently (2019) announced an end to the long-standing practice of importing raw used recyclables from the United States, substantially increasing the domestic costs of recycling in the US; 3. The success and efficient logistics of online marketplaces like Amazon.com and Walmart.com have enabled consumers to obtain virtually anything they could want in a matter of days—or even hours in some cases—by simply ordering online for home delivery.

To date, there have been few widespread attempts to solve the problems stated above. Re-usable containers are commonly used in Business-to-Business or internal commercial logistics (such as the mail totes used internally by USPS, or milk crates used in the food service industry). Although these methods and containers are very durable and can be reused many times, they are not suitable for ground- or air-delivery via mail carriers such as UPS, FedEx or USPS because they do not close on all sides to protect the product being shipped, or provide a seal for tamper evidence. Further, they tend to be heavy and therefore prohibitively expensive to ship via mail carrier.

There have been commercial attempts to offer a soft-side reusable zipper pouch that is shipped and returned via US mail. However, these are limited to shipping small, flat, non-fragile products such as apparel or linens because it does not transform the interior shape of the pouch (they simply expand due to the stretch of the fabric they're made from) nor do they provide adequate protection from breakage for the products inside.

An alternatively approach to reducing waste in the packaging industry has been to offer "compostable" mailers and boxes. There are a variety of products made from corn by products or other "organic" materials. However, these products typically must be collected and sorted to an industrial composter, which exist only in a few municipalities in the US. Further, they do not save on resources related to manufacturing in the same way that a reusable container does. Thus, it is desirable to provide a new type of parcel shipping box that provides an alternative to single-use cardboard boxes and a method that allows the shipping box to be easily reused.

DETAILED DESCRIPTION OF ONE OR MORE EMBODIMENTS

The disclosure is particularly applicable to a parcel shipping box illustrated and described below and it is in this context that the disclosure will be described. It will be appreciated, however, that the parcel shipping box and method has greater utility, such as to other types of shipping containers, shipping containers of different sizes and shapes and other changes that are within the scope of the disclosure. Furthermore, the box may be made out of different materials that are also within the scope of the disclosure.

The reusable box as illustrated in the figures and described below addresses the myriad problems described above by replacing single-use cardboard boxes with a durable alternative, designed to be reused over and over via an efficient returns system. The reusable box is a new type of box that can be packed similarly to typical cardboard boxes when erected, but then folded flat for a cost-effective and convenient return process when empty. By folding flat between uses, the reusable box saves space during transport by consumers and enables bulk storage/delivery (via palletization) for commercial use. The design enables workers to erect the box quickly without the use of special tools, tape, or other single-use fasteners or sealants. Every time the new box is used, the community saves on energy and environmental damage associated with cardboard boxes. The innovation of the physical form of the reusable box is driven by the need to provide consumers a convenient way to return the reusable boxes with minimal damage, so they may be reused by an online retailer at a cost not significantly higher than the current option, and/or with significant improvement to justify a higher market price.

While typical cardboard boxes are manufactured from a two-dimensional sheet of corrugated paperboard, the typical designs require adhesives to hold the box shape when erected. The result is that in order to break down these boxes for disposal, consumers must cut or crush the box, eliminating the possibility of reuse. Further, the common types of tape used to seal cardboard boxes for security and durability purposes actual damage the surface of the cardboard when removed, rendering them less durable and reducing the possibility of reuse.

Figure 1:
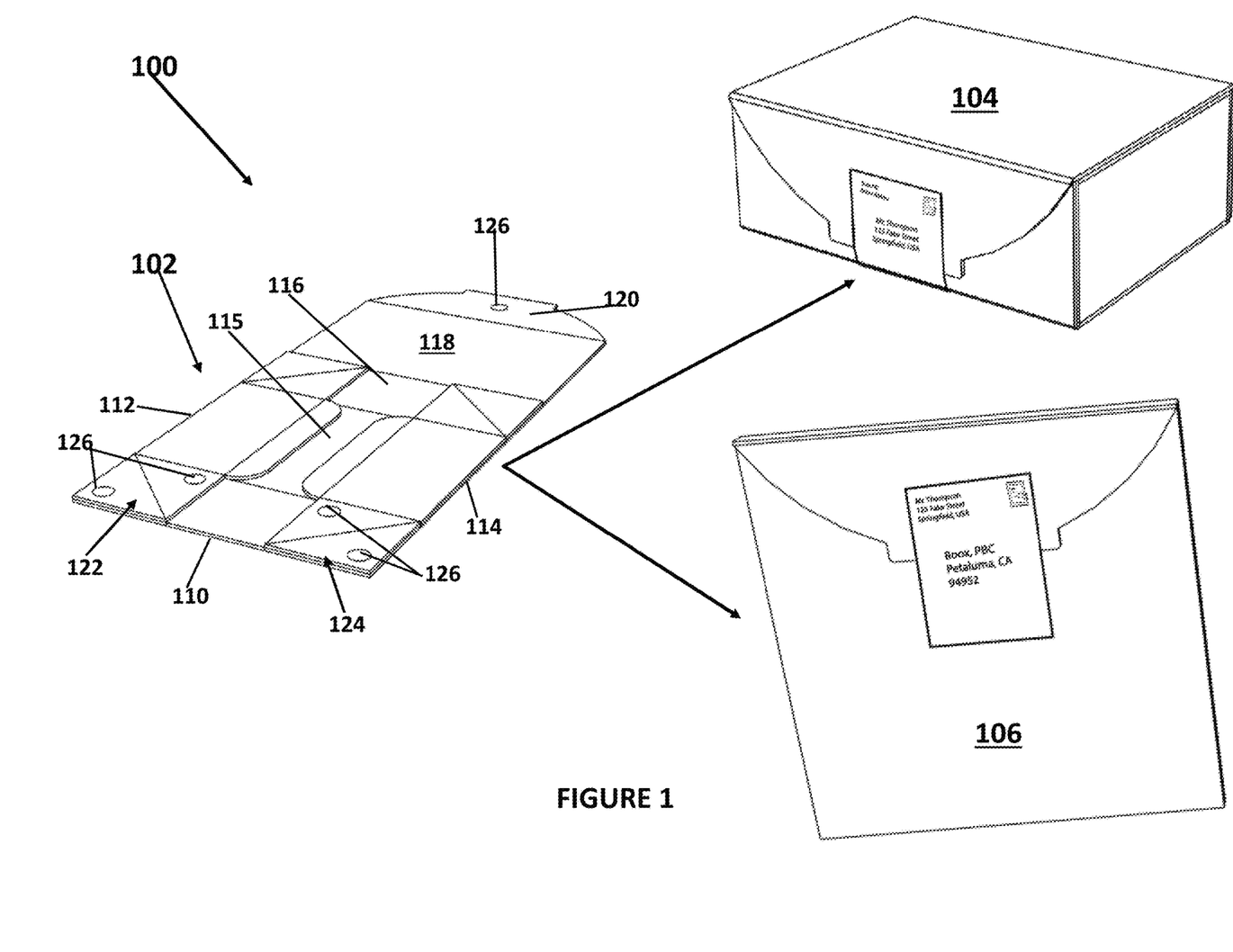
FIG. 1 illustrates an embodiment of a reusable parcel shipping box showing that the reusable parcel shipping box is configurable into a parcel shipping box and a mailer.

FIG. 1 illustrates an embodiment of a reusable parcel shipping box 100 showing that the reusable parcel shipping box is configurable into a parcel shipping box and a mailer. The box 100 may have an initial configuration 102, a parcel box configuration 104 and a mailer configuration 106. The box 100 may be reconfigured from the initial configuration 102 to either of the other configurations without tape, glue and/or an adhesive that is ordinarily required for the conventional cardboard shipping boxes.

The box 100 may be made of a material so that the box 100 may be reused more than 1-2 times and the material may be a durable, non-porous material, lightweight is desirable to keep shipping costs low, but sturdy enough to protect products being shipped in transit (industry standard is that the container must survive a 36" drop onto its corners without damaging the interior product). The material of the box 100 also should not tear or be damaged when tape or labels are removed. In one embodiment, each surface of the box 100 may be made of polypropylene that is extruded into a corrugated sheet, then die cut or CNC cut in a known manner into a proprietary design. The above box blank may then be folded and glued to create 4 flexible gussets in the 4 corners of the box format that can fold inward to allow the box to fold flat into an envelope shape. In addition to the utility functionality, it is important from a marketing point of view that the material used have a high efficiency level of recycling so that at end of life, the box can be recycled down to its raw material and made available to make more of the reusable boxes without generating excessive waste, and offering a comparatively lower carbon footprint than that of corrugated cardboard boxes. In some embodiments, the box 100 can be reused 5-20 times before end of life or more than 50 times. In order to make the end of life process cost effective, a single material must be the predominant raw material used (i.e. multi-material products are much more difficult/expensive to recycle). In a preferred embodiment, a commercially available product "Coroplast" may be used but there are a variety of alternatives available domestically and overseas. More generally, the material may be "corrugated plastic sheeting" or "fluted plastic sheeting". In other embodiments, any material that meets the specifications above "could" be used. For example, a non-limited list of possible alternative materials may include injection molded plastics, fabrics with woven structures, silicon with structural rigidity and/or nylons with structural rigidity. An example of the specifications for the commercially available Coroplast product (found at www.coroplast.com/wp-content/uploads/General-Specifications-Glossary.pdf) appears in Appendix A (that forms part of the specification. The characteristics of the material found in Appendix A form a set of minimum requirements of the materials to be used to manufacture of the box 100.

The box 100 may be made to different sizes, shapes and weight limits and a particular size, shape and weight limit for a particular box depends on a variety of existing external factors that guide the physical specification that may be primarily related to existing infrastructure used by mail carriers including U.S. Postal Service ("USPS"), United Parcel Service ("UPS"), and/or Federal Express ("FedEx"). For example, USPS collection boxes (blue bins) have an opening that allows for packages to be dropped off that are no larger than ~16"×12"×1". Reusable boxes that are returned via USPS could be larger, but would need to be dropped off inside the mail offices, leading to significantly less efficient returns and many fewer locations for consumers to return the boxes. To keep outgoing shipping costs within a competitive range, the thickness of the walls of the box 100 must not be so thick that the cost of shipping rises more than 10% or so above the baseline. Technically, USPS considers containers that are greater than ¾" thick to be "Parcels" whereas containers that are ¾" thick or less may be considered "Large Flats" or "Envelopes. Large Flats and envelopes are handled differently and incur much lower shipping charges than "parcels" as defined by the USPS and most other mail handlers. In order to fold flat to fit with the USPS "Large flat" limitations, the largest erected box size to date is ~16'×12'×6" (outer diameter). However, the box 100 is not limited to that size and larger boxes can be designed that still can be returned using the existing USPS infrastructure.

The wall thickness of each portion of the box 100 may be designed to be similar to common cardboard thickness (known as "B Flute" in the cardboard industry) so that a customer of the box 100 would not have to change their infrastructure much to switch (i.e. their internal packaging, warehouse shelving, etc. can stay the same). The hollow structure of the wall of each portion allows the overall box to be lightweight while also providing insulation (both for product protection and a small amount of heat/cold insulation) Furthermore, each wall may be much stronger than cardboard per these specs provided above in Appendix A and may be waterproof, resistance to chemical spills, resistant to the elements, adds no production of dust, resistance to impact damage, and colorfast, even when exposed to most UV light, can be made flame retardant, costs significant less energy to recycle.

The box 100 may have an end portion 110, a first and second side portions 112, 114, a bottom portion 115, a back portion 116, a top portion 118 and a flap portion 120 that all lay flat as shown in FIG. 1 in its initial configuration. As shown in the figures, each of the above portions are separated from each other by score/fold lines that allow each of the portions to fold/move relative to the other portions. The box 100 may have two types of fold lines that may include "creases" which simply compress the material and allow for <90 degree bends, and "scoring" where the material is cut about 75% through, which allows for 180+ degree bends. The material used enables this full range of folding motion compared to cardboard, as polypropylene is used to make "living hinges" (flexible for thousands of bends without breaking).

The box 100 may also have a first and second gusset portion 122, 124 that connect the end portion 110 to the first side portion 112 and the end portion 110 to the second side portion 114, respectively so that the side portion 112, 114 and end portion 110 fold up when the box 100 is reconfigured into the box configuration 104, but can lie flat in the initial configuration 102. The box may also have the first and second gusset portions 122, 124 that connect the back portion 116 and the two side portions.

Each gusset portion 122, 124 may have an attachment mechanism 126 that secures the gusset portion in an upright position in the box configuration 104. In one embodiment, the attachment mechanism 126 may be attached to the gusset portions 122, 124 connected to the end portion 110 and the side portions 112, 114 as shown in FIG. 1, but in other embodiments, the attachment mechanism 126 may also be attached to the two gusset portions 122, 124 that connect the back portion 116 and side portions 112, 114.

In one embodiment, the attachment mechanism 126 may be a hook and loop closure or a re-closeable fastener. For example, a commercially available "Dual Lock"® made by 3M® may be used. Thus, the box 100 may have one piece of the hook and loop closure on each portion of the gusset portion, but may be implemented using a variety of dual-sided attachment mechanisms or re-closeable fasteners. The tensile strength of the re-closeable fastener may be such that it that keeps the lid closed without popping open, but can be pulled apart easily by most people. Alternative re-closeable fasteners magnets, metal snaps, a zipper, non-permanent adhesive, buttons and other textile closures (known as "findings" in the textile industry), or a tab system, where the material slots into itself.

In one embodiment, a first of the hook and loop closure elements may be on a surface of the gusset portion while the second of the hook and loop closure element may be recessed into the other gusset portion that helps to maintains the limited overall thickness of the mailer configuration 106 and ensures that there is not a large gap between the gusset and the side portion when assembled. As shown in FIG. 1, an inner surface of the flat portion may have the attachment mechanism 126 with the other portion of the attachment mechanism on an outer surface of the end portion 110 (not shown in FIG. 1).

Figure 2A:
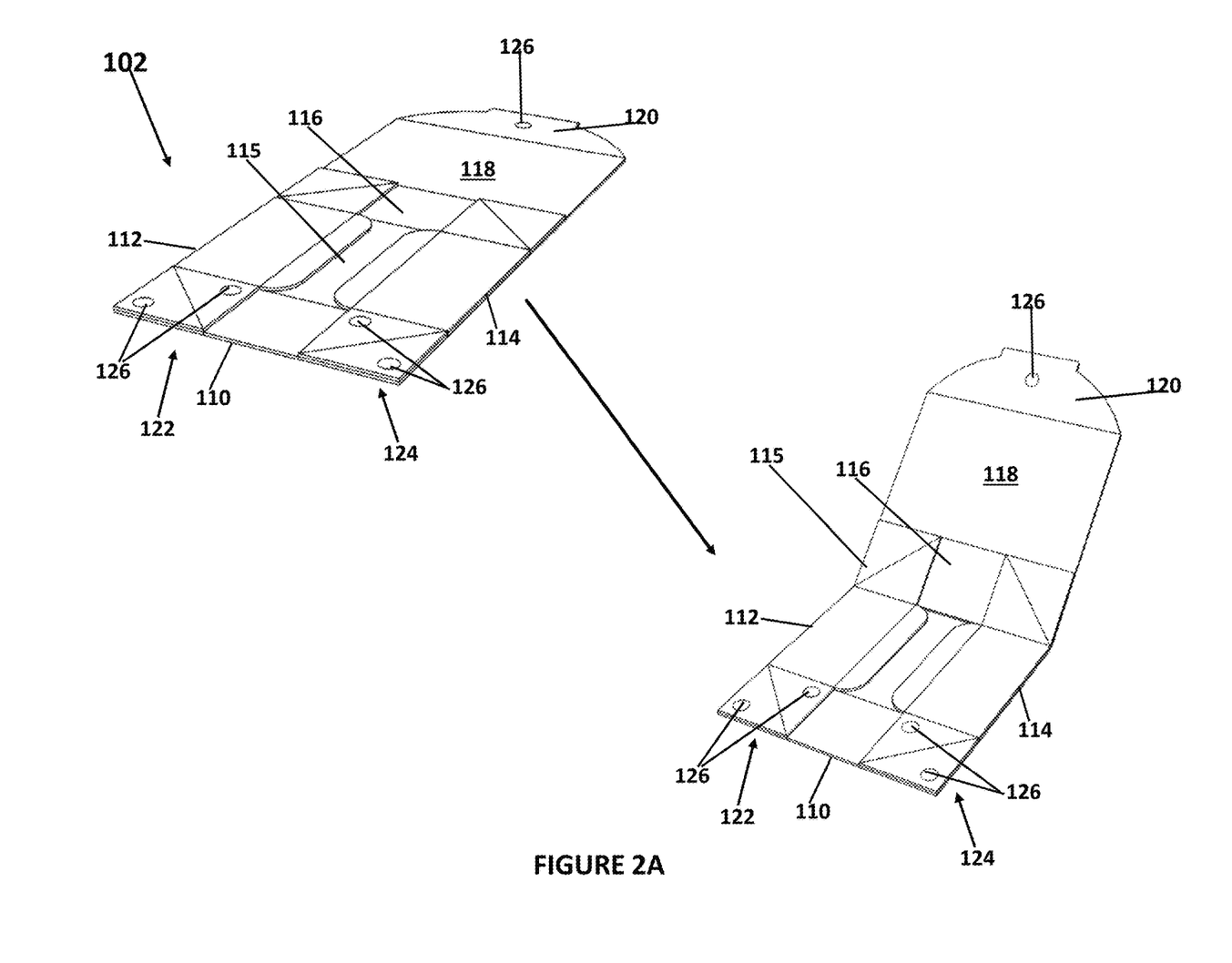
FIGS. 2A-2D illustrate a process for reconfiguring the parcel shipping box from an initial state into a ready to use parcel shipping box.

FIGS. 2A-2D illustrate a process for reconfiguring the parcel shipping box from an initial state 102 into a ready to use parcel shipping box configuration 104. FIG. 2A shows the initial configuration 102 and a first process in which the back portion 116, top portion 118 and flap portion 120 are folded upwards such that the gusset portion 122, 124 connected to the back portion begin to move.

Figure 2B:
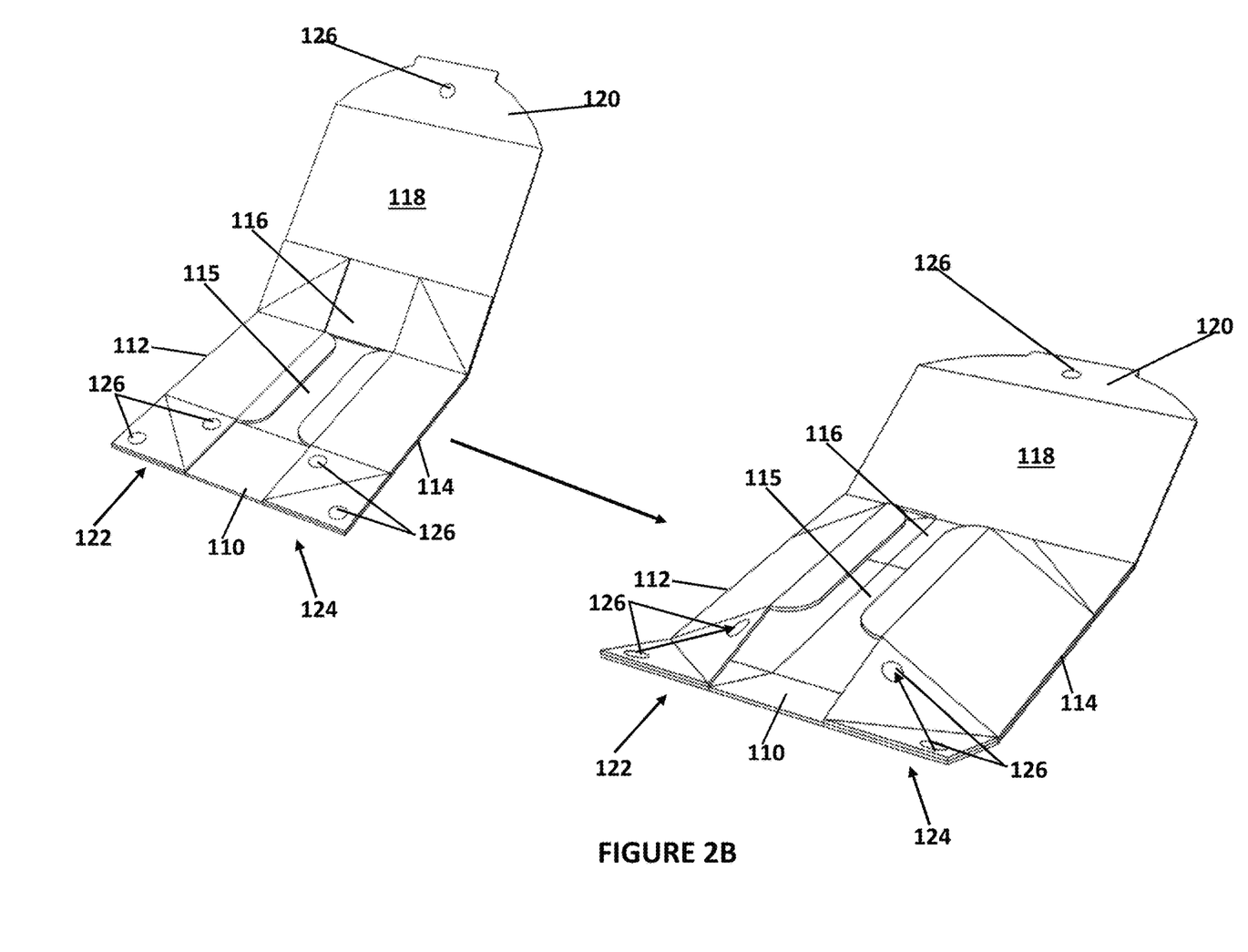
Figure 2C:
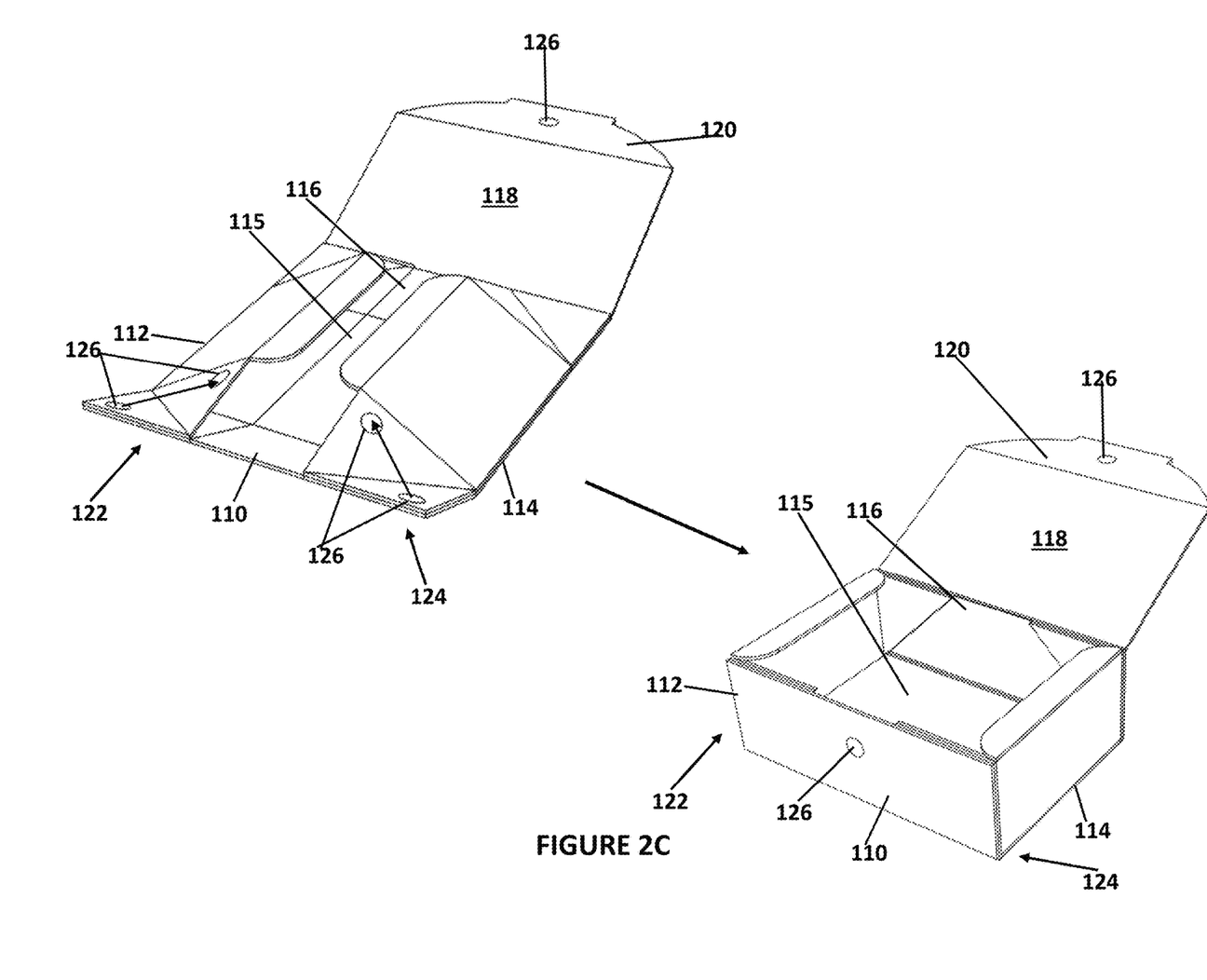
Figure 2D:
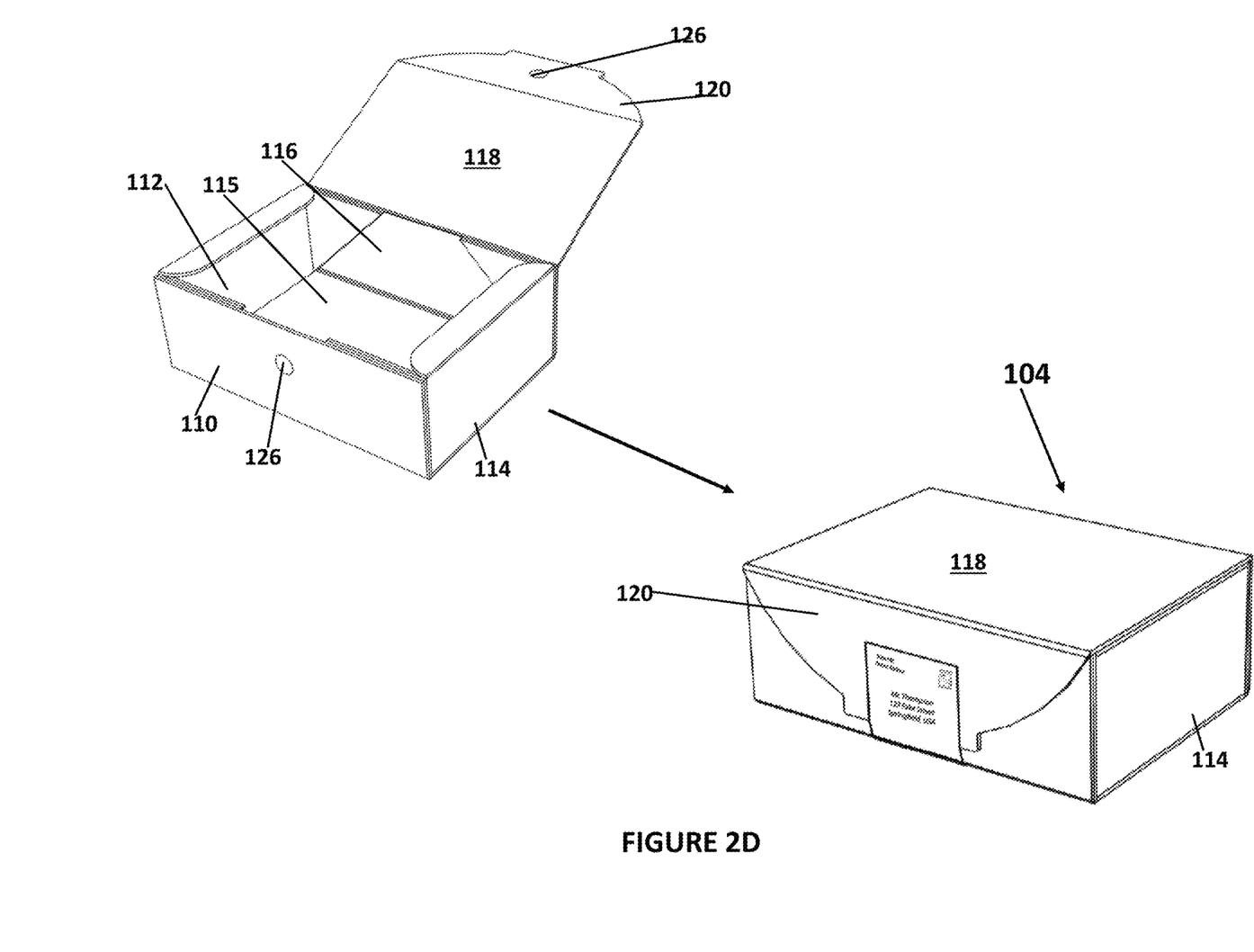

FIG. 2B shows the position in FIG. 2A being further reconfigured to the box configuration. As shown in FIG. 2B, each side portion 112, 114 may be moved vertically away from the bottom portion 115 such that the gusset portions 122, 124 at the from the box begin to fold into the box configuration and the two pieces of the attachment mechanism 126 move towards each other. In addition, the end portion 110 is folded up. FIG. 2C shows the position of FIG. 2B being further configured into the box in which the end portion 110 is brought up to the side portions 112, 114 and the attachment mechanism on the gusset portions 122, 124 are secured to each other and cannot be seen in FIG. 2C. In this configuration, the back portion 116 is also brought up to the side portions and the attachment mechanism at the gusset portions adjacent the back portion are secured together. In FIG. 2C, the two attachment mechanism 126 on an inner surface of the flat portion 120 and the outer surface of the end portion 110 can be seen and are used to close and secure the box shut once the articles are placed into the box. FIG. 2D shows the completed configuration of the box to the box configuration 104 in which the item(s) are placed into the box 100 and the top portion is folded over the box and the flap portion 120 secured by the attachment mechanism 126.

Figure 3A:
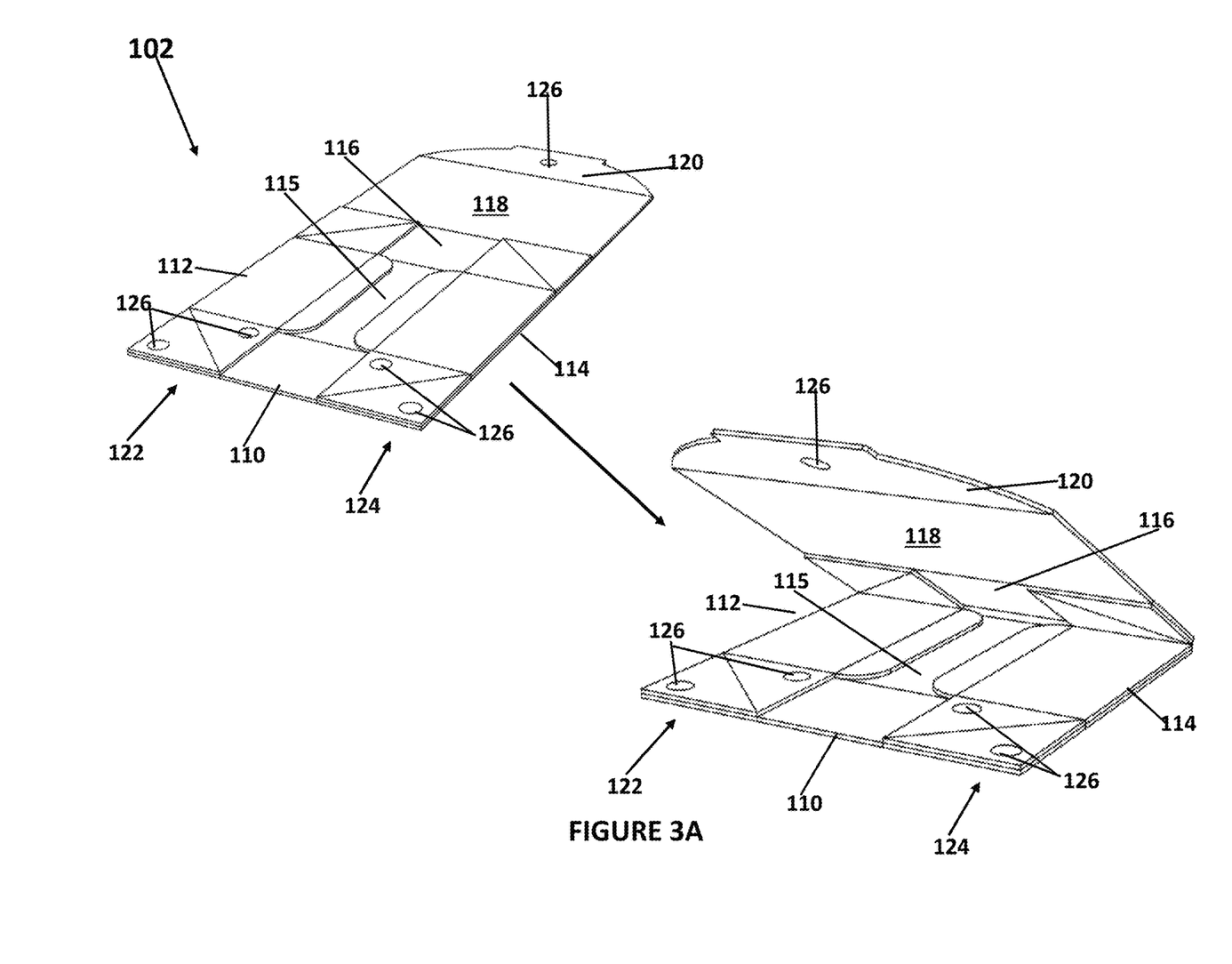
FIGS. 3A-3D illustrate a process for reconfiguring the parcel shipping box from an initial state into a mailer so that the parcel shipping box may be returned.
Figure 3B:
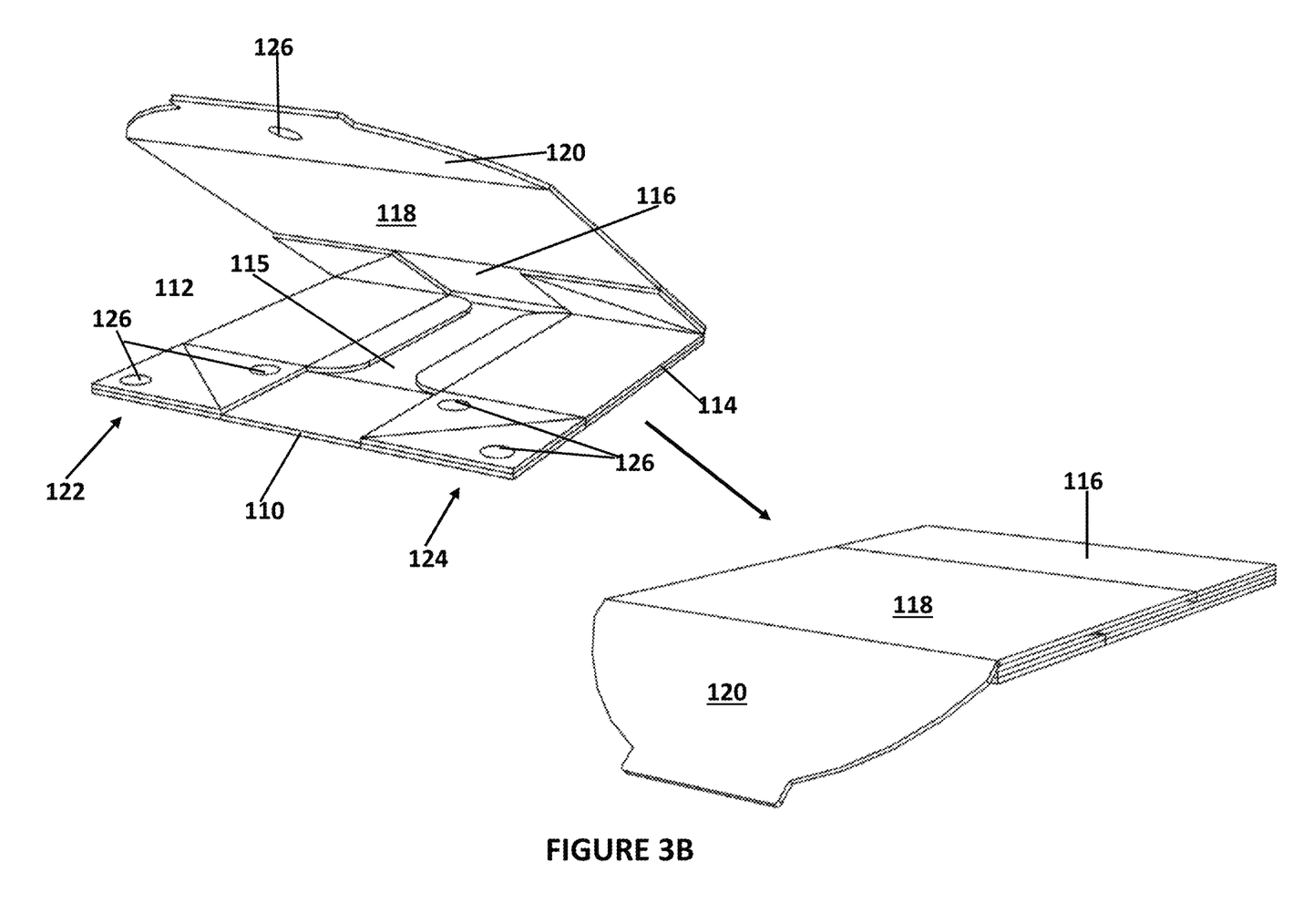
Figure 3C:
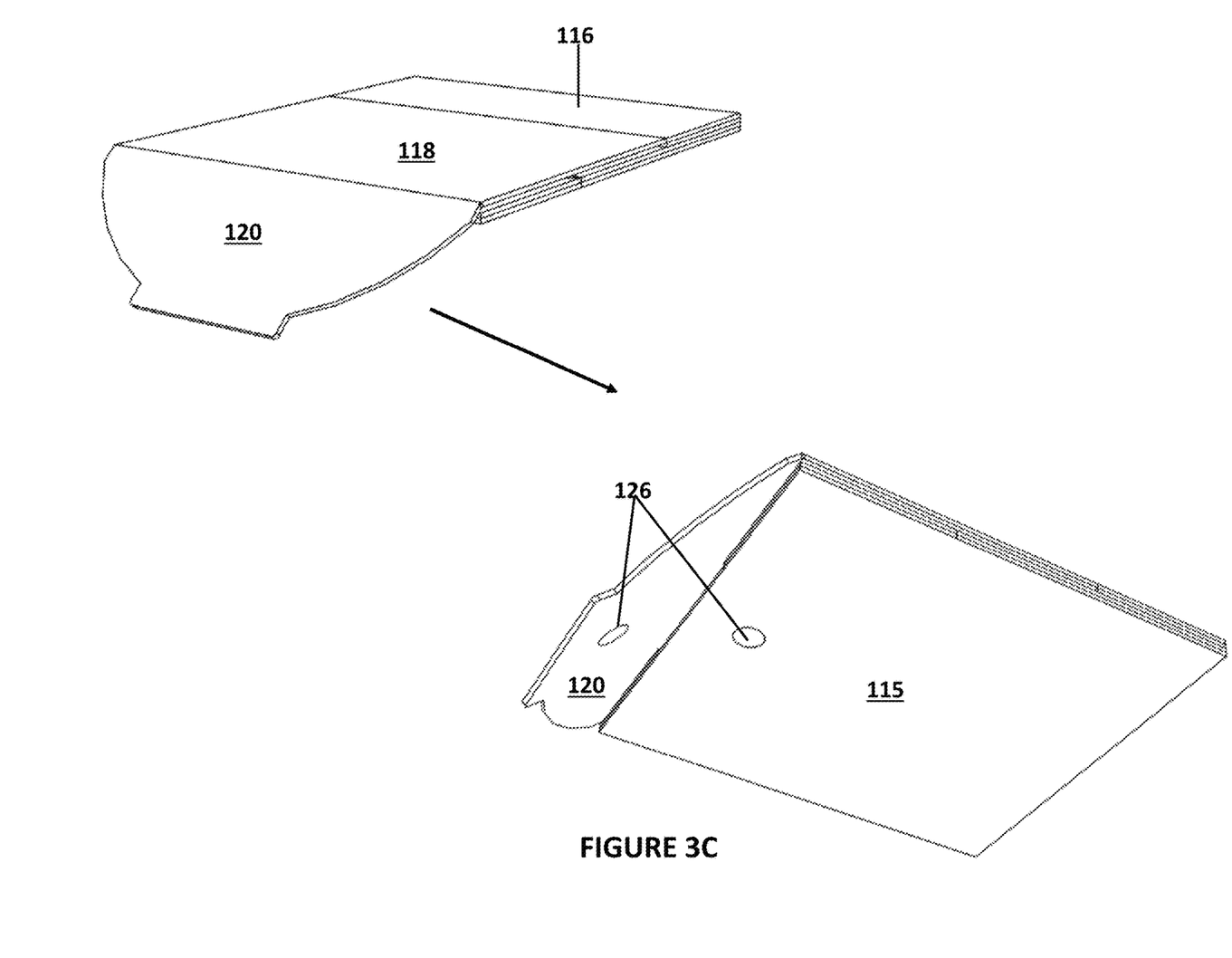
Figure 3D:
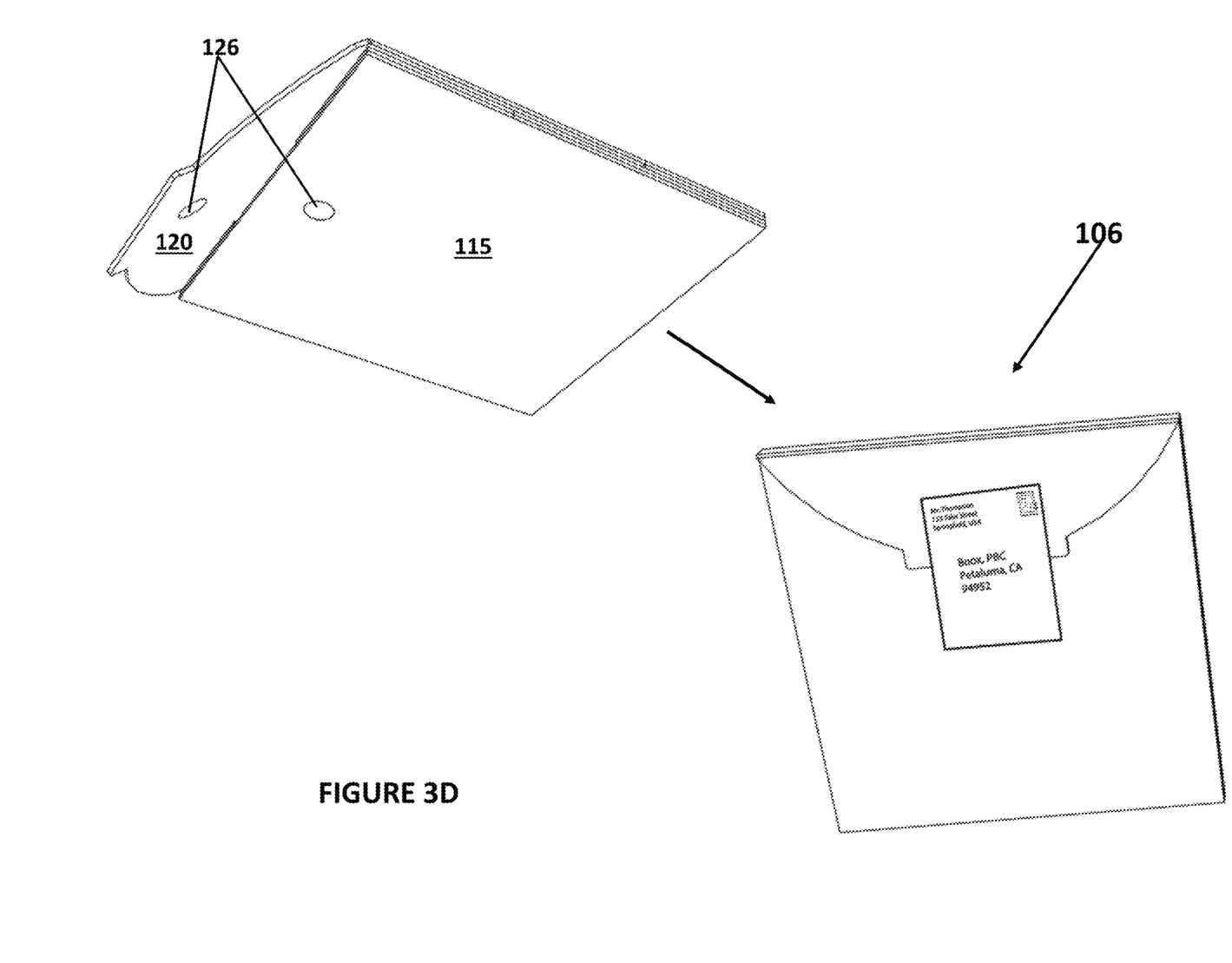

FIGS. 3A-3D illustrate a process for reconfiguring the parcel shipping box from an initial state 102 into a mailer 106 so that the parcel shipping box may be returned efficiently. FIG. 3A shows the initial configuration 102 and a first process in which the back portion 116, top portion 118 and flap portion 120 are folded over the other portions of the box. FIG. 3B shows the position in FIG. 2A being further reconfigured to the mailer configuration in which the back portion 118 lays flat on top of the side portions 112, 114 and the other portions. FIG. 3C shows the other side of the flap portion 120 and the bottom portion 115 that has the two pieces of the attachment mechanism 126 that can be secured to each other to close the mailer into the mailer configuration 106 shown in FIG. 3D.

Figure 4A:
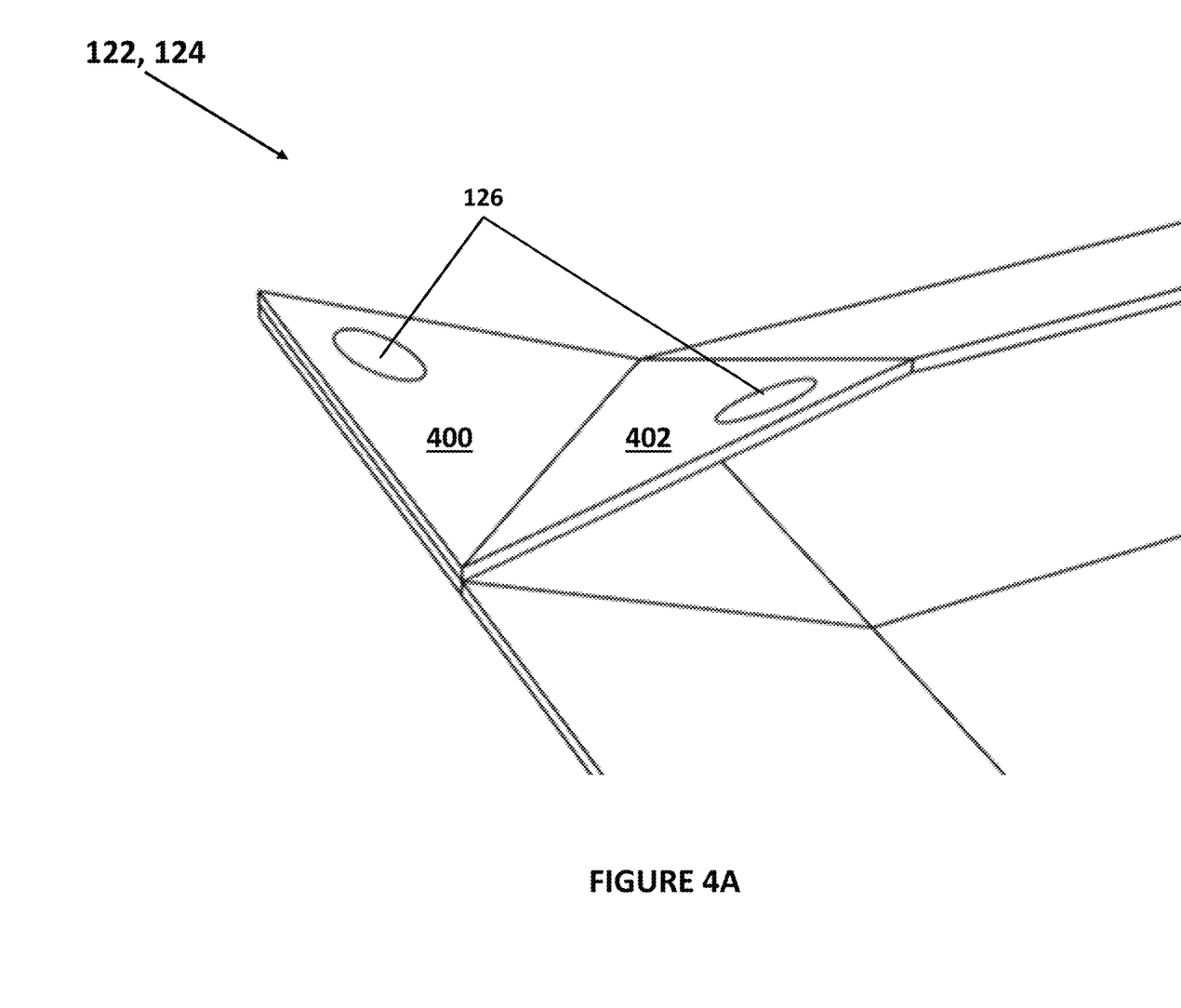
FIGS. 4A and 4B show more details of each gusset in an open position and a closed position respectively.
Figure 4B:
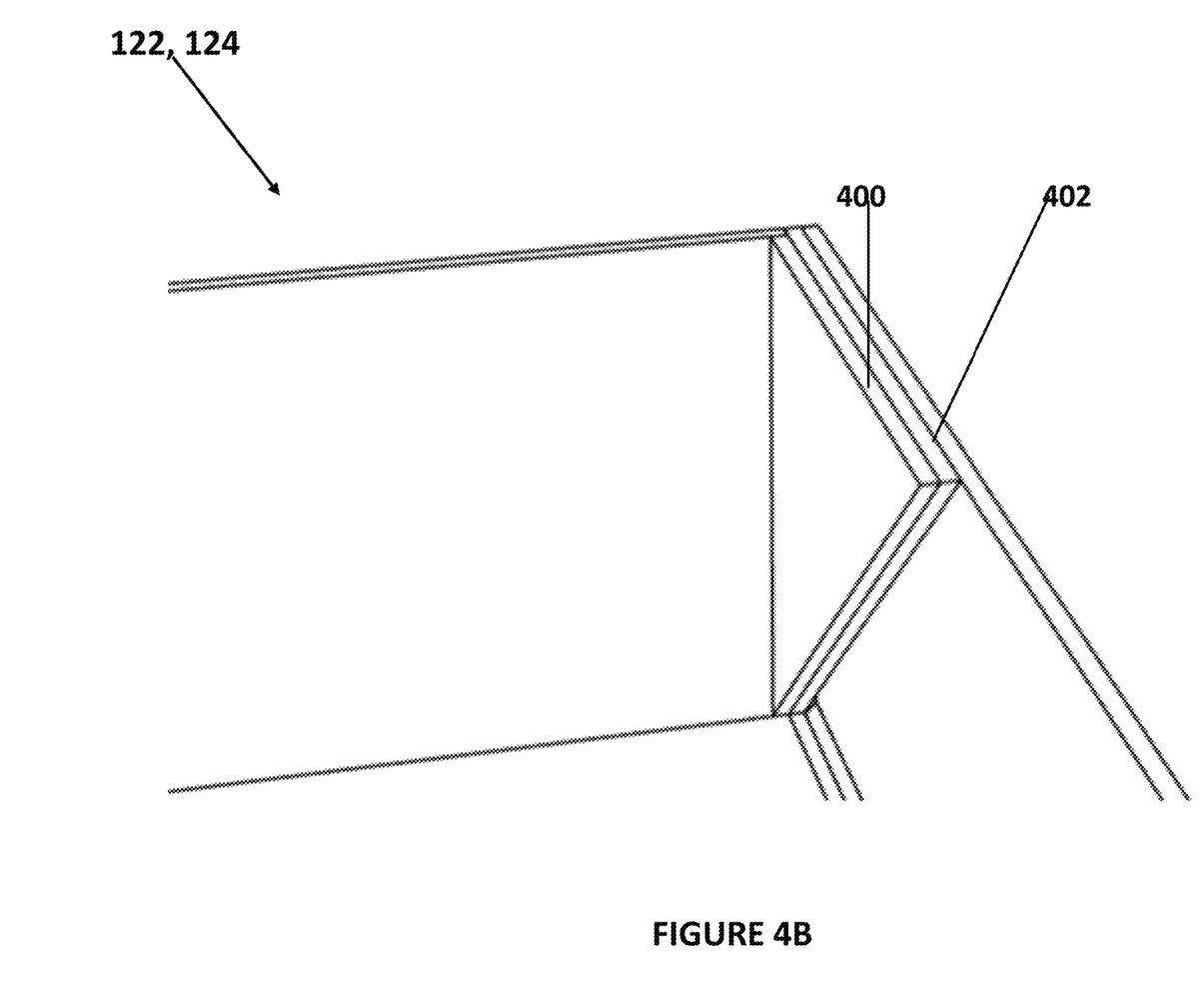

FIGS. 4A and 4B show more details of each gusset 122, 124 in an open position and a closed position respectively. There may be a gusset portion 122, 124 at each corner (two front corners and two rear corners) of the box 100 and the gusset portions 122, 124 permit the box to be in a flat configuration and then reconfigured into the box configuration 104 without any tape that would be required for ordinary cardboard boxes. Each shown in FIG. 4A, each gusset portion 122, 124 may have a first triangular piece 400 foldable connected to a first portion of the box 100 and a second triangular piece 402 foldable connected to a second portion of the box 100 (the intersection of the first and second portions of the box 100 that form a corner of the box 100) and also foldably connected to the first triangular piece 400. Each of the triangular pieces 400, 402 has one or more attachment mechanism 126 pieces that releasable secure the triangular pieces 400, 402 to each other (thus creating each corner of the box 100) when in the box configuration as shown in FIG. 4B. As shown in FIG. 4B, when the gusset portion 122, 124 is in the closed position, the two triangular pieces 400, 402 lie adjacent to each other and against one portion of the box which creates a stronger corner of the box 100.

In other embodiments of the box 100, the box may include (or have an embedded) RFID or NFC device that allows the box to be tracked throughout its life in either the box configuration or the mailed configuration. For example, the box 100 may have an embedded identifier device, such as an RFID device or NFC device) that stores a unique identification (UUID) number for each box so that a system can internally track the asset for inventory purposes, reports on location, record its return to return places, bill customers for usage, maintain customer inventories, etc. In addition, some consumer-facing information will be available to anyone that scans the ID code of the individual box including environmental impact, miles travelled, etc. Furthermore, this same ID will be digitally linked to the product inside the box, so that curated information specific to the product inside can be tracked and displayed to the consumer. For example, if a consumer receives a pair of socks from a company in Vermont, the information contained in the ID could a promotional advertisement for shoes from Vermont or a vacation to Vermont, or for suggestions on shoes that would pair well with the socks.

The box 100 may further comprise a transparent pocket/sleeve that allows for a changeable graphic insert or similar for each retailer to market their own unique branding on the box. The system (or an app associated with the system) may provide an augmented reality scanner to reveal the product inside without opening the box. Furthermore, a display screen may be embedded in the wall of the box (inside or outside) that can store and display information associated with the shipment and/or product and be updated remotely. In some embodiments, the box 100 may have a locking mechanism with a unique code that prevents theft/tampering and/or an embedded GPS tracking device to track the box that may be in addition to the identifier element or instead of the identifier chip.

In an embodiment of the box 100 in which a QR code (or other identifier such as RFID or NFC) is inside of the box, the process to convert the shipping box configuration into the mailer configuration may include the following processes:

1. Unseal the box by cutting the seal created by the shipping label or removing the label entirely by pealing it off.
2. Separate the top tab from the exterior side wall by prying apart the re-closeable fastener
3. Fully open the box by extending the lid past the back wall until it is fully open and the product can be removed.
4. The scannable QR code is now visible and can be scanned using a smartphone to obtain product information, view return instructions, etc.
5. Remove the product from the box.
6. Using thumb and forefinger, separate the re-closeable fastener that is connecting the folded gussets to the front wall of the box.
7. Unfold the gussets and flatten them inward, so that the side walls of the box touch the bottom of the box.
8. Identify the double crease near the center of the fully flat box, and fold the top flap of the box towards you so that it flattens down to the bottom surface of the box, creating a shape that is half the size and twice the thickness of the material.
9. Turn the entire box over away from you, and rest it on its top. Secure the two surfaces of the envelope form together by pressing in the middle of the form, engaging the interior re-closeable fasteners.
10. Fold the top flap over, securing it in place with the same re-closeable fastener that held it closed in box form in step 2.

In one embodiment, the box 100 may be returned in the mailer configuration via US Postal Service or other parcel or mail carriers to a designated place. Alternatively, a consumer that has received the box 100 may return the box 100 be dropping the box 100 off at a local business that would collect them so that the boxes 100 could be picked up by a third party, such as the company that made the boxes 100. In either of the above methods of return, each box 100 fold flats as described above. In the example in which the boxes are collected at a local business, the boxes can have different shapes and sizes since the folded flat box/mailer configuration does not have to meet the same USPS mailing limits described above.

In some embodiments, the box 100 may have, instead of the scannable QR code discussed above, a scannable ID chip (RFID, NFC, etc.) and the scannable ID chip would store information that could be retrieved by scanning the ID chip. The stored information may include, for example, user-specific information, product-specific information, and/or information related to the box 100 itself, such as data on distance travelled, number of uses, shipping origin/destination, etc.

Figure 5:
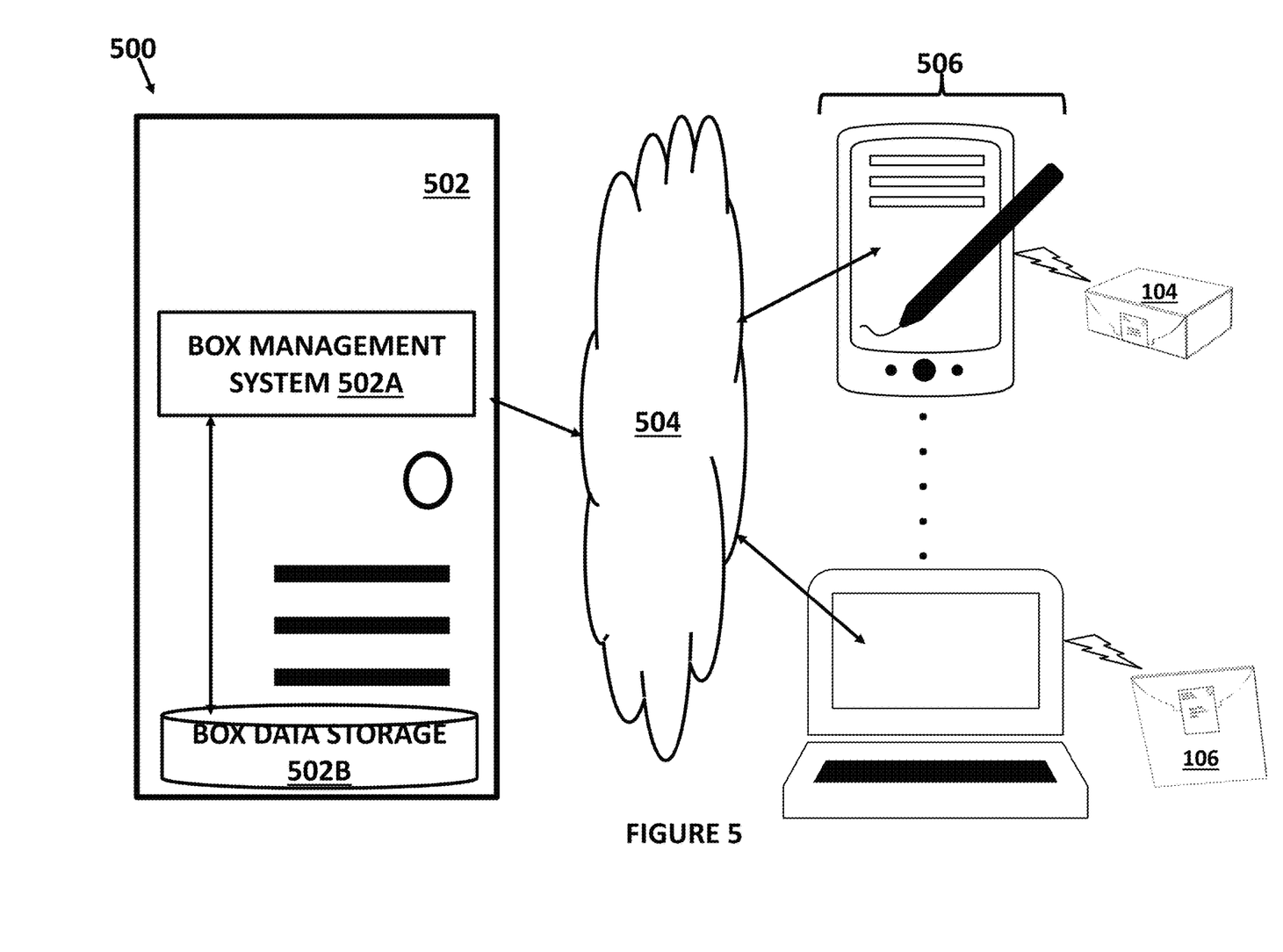
FIG. 5 illustrates a box management system.

FIG. 5 illustrates a box management system 500. The box management system 500 may include a backend system 502 that can connect via a communications path 504 to one or more computing devices 506 of users of the box 100 (shown in its parcel box configuration 104 and in its mailer configuration 106). Each computing device 506 may be a processor based device with memory and at least communication circuits that allow the computing device to communicate with the backend system 502. Each computing device 506 may communicate with the backend 502 and/or display box management data to the user of the computing device using a browser application executed by the processor of the computing device, using a box management application and/or using a mobile application, both of which are executed by the processor of the computing device.

The backend 502 may be implemented as one or more computing resources such as a processors, server computers, blade servers, application servers, database servers, etc. The backend system 502 may include a box management system 502A and a box data storage 502B wherein the box management system 502A may be a plurality of lines of instructions/computer code that are executed by a processor of the backend system 502 so that the processor is configured to perform the box management processes and the box data storage 502B may be implemented as a software or hardware based database or other data storage system. The box data storage 502B may store user data, the code of the system and data about each box 100 and its current location, etc. The box management system 502A may perform various box management processes such as tracking the location of each box, communicating with each computing device 506 and providing/receiving data to each computing device.

For example, the box management system 502A may provide augmented reality (AR) data to each computing device 506 so that each computing device 506, using some application as described above or even an AR application, can display box management AR data to the user. In one example, the computing device, using AR technology, may display the product(s) inside of a box associated with the user without opening the box, or to advertise other products and show them in augmented reality (superimposed inside a room, etc.) to the end user.

The box management system 502, when a particular box is being sent to a particular user, may download data to a memory device of the box wherein the data may include shipment information or product information. The memory device of each box 100 may be a semiconductor memory device, an RFID tag memory, etc. The box management system 502 may also remotely update this data to reflect changes in the shipment data. Each box 100 may then have the memory device, a processor and a display screen connected together and embedded into a wall of the box (inside of outside of the box) that display the product and shipment data to the user.

Each box 100 may also have a locking mechanism with a unique code that prevents theft/tampering. For example, the locking mechanism may be a commercially available and known blue-tooth, radio frequency ID (RFID), and near field communication (NFC) mechanisms for locking the box 100. The box 100 may further have a mechanical locking mechanism on/in the box 100 that is controlled by the above technologies. More specifically, using a blue-tooth or NFC enabled locking system, a user would unlock the box 100 by entering a unique code on his device while its in proximity to a locked box 100. Each box 100 may also include an embedded location tracking device, such as a GPS receiver, etc. that can determine the location of the box and send that location information to an adjacent computing device 506 or onto the box management system 502. The location data may also be stored in the memory device of the box 100. In some embodiments, the various data stored in the memory device of the box 100 may be read and/or written by an automated delivery vehicle, such as a drone.

Each box 100 may also have a permanent "Universal shipping label" that is unique for each box 100. The universal shipping label can be read by any parcel carrier to inform the necessary information to charge the sender for the appropriate parcel cost based on weight, dimensions, origin/destination, etc.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method, comprising:
forming a parcel box configuration for a box having a bottom portion, an end portion and a back portion foldably connected to each other and two side portions foldably connected to the each of the bottom and back portions, wherein each side portion is attached to the front portion by a gusset and each side portion has a first attachment device and the front portion has a second attachment device on each end of the front portion that is adjacent to each first attachment device of each side portion, wherein forming the parcel box configuration further comprises connecting the first and second attachment devices to each other so that the two side portions are approximately perpendicular to the bottom portion and to the front portion, wherein the parcel box configuration is capable of being sent using United States Postal Service (USPS);
generating, on a display of the box, an augmented reality display showing a product inside of a closed parcel box configuration; and
forming a mailer configuration for the box in which the bottom, end and two side portions lay flat with the back portion and a top portion connected to the back portion being folded over the flattened bottom, end and two side portions and the flattened bottom, end and two side portions and the back and top portions being stacked on top of each other so that the box in the mailer configuration meets USPS limits and is capable of being sent using USPS and is reusable.

2. The method of claim 1, wherein forming the parcel box configuration further comprising folding, at a crease at an edge of each portion, each portion to form the parcel box configuration and wherein forming the mailer configuration further comprising folding, at the crease at the edge of each portion, each portion to form the mailer configuration.

3. The method of claim 2, wherein forming the parcel box configuration further comprises closing the box using a lid portion that foldably connects to the back portion.

4. The method of claim 3, wherein closing the box further comprising locking, using a locking mechanism, the closed box when in the parcel box configuration.

5. The method of claim 1, wherein connecting the first and second attachment devices further comprises using a hook and loop enclosure.

6. The method of claim 1 further comprising scanning a scannable ID mechanism connected to the box to determine an identity of the box.

7. The method of claim 1 further comprising converting the box between the parcel box configuration and the mailer configuration so return to box in the mailer configuration to a shipping source so that the box is reusable.

* * * * *